US007786206B2

(12) United States Patent
Doki et al.

(10) Patent No.: US 7,786,206 B2
(45) Date of Patent: Aug. 31, 2010

(54) THERMOPLASTIC RESIN COMPOSITION

(75) Inventors: Makoto Doki, Tokyo (JP); Takaaki Miyoshi, Tokyo (JP); Kazuya Noda, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 322 days.

(21) Appl. No.: 11/795,374

(22) PCT Filed: Jan. 17, 2006

(86) PCT No.: PCT/JP2006/000504

§ 371 (c)(1),
(2), (4) Date: Jul. 17, 2007

(87) PCT Pub. No.: WO2006/077818

PCT Pub. Date: Jul. 27, 2006

(65) Prior Publication Data
US 2008/0146722 A1   Jun. 19, 2008

(30) Foreign Application Priority Data
Jan. 18, 2005  (JP) ............... 2005-010532
Apr. 21, 2005  (JP) ............... 2005-123051

(51) Int. Cl.
*C08K 3/34* (2006.01)
*C08L 77/00* (2006.01)
(52) U.S. Cl. ............. 524/451; 524/493; 525/92 B; 525/92 D
(58) Field of Classification Search ........ 524/451, 524/493; 525/92 B, 92 D
See application file for complete search history.

(56) References Cited

U.S. PATENT DOCUMENTS 3,379,792 A   4/1968  Finholt 5,086,105 A   2/1992  Abe et al.
5,475,049 A   12/1995  Ohtomo et al.

FOREIGN PATENT DOCUMENTS

| JP | 45-997 | 1/1970 |
|----|--------|--------|
| JP | 2-163158 | 6/1990 |
| JP | 4-372656 | 12/1992 |
| JP | 04372656 A * | 12/1992 |
| JP | 5-220826 | 8/1993 |
| JP | 6-145499 | 5/1994 |
| JP | 2002-194206 | 7/2002 |
| JP | 2002-194207 | 7/2002 |
| JP | 2003-171564 | 6/2003 |
| JP | 2003-528941 | 9/2003 |
| JP | 2004-107488 | 4/2004 |
| JP | 2004107488 A * | 4/2004 |
| JP | 2004-285136 | 10/2004 |
| JP | 2004-323826 | 11/2004 |
| WO | WO-01/36536 A1 | 5/2001 |

OTHER PUBLICATIONS

JP 2004107488A, Apr. 2004, Horio, M., Machine translation.*
JP04372656, Horio, Dec. 1992, English Translation.*

* cited by examiner

*Primary Examiner*—Satya B Sastri
(74) *Attorney, Agent, or Firm*—Finnegan, Henderson, Farabow, Garrett & Dunner, L.L.P.

(57) ABSTRACT

A thermoplastic resin composition comprising:
(A) 30 to 80 parts by mass of a polyamide;
(B) 20 to 70 parts by mass of a polyphenylene ether;
(C) 0 to 40 parts by mass, based on 100 parts by mass of the total amount of the polyamide (A) and the polyphenylene ether (B), of a rubbery polymer; and
(D) 10 to 50 parts by mass, based on 100 parts by mass of the total amount of the polyamide (A) and the polyphenylene ether (B), of a platy inorganic filler having an average particle size of 9 to 20 μm, and having a particle size ratio (d75%/d25%) of the particle size (d75%) at 75% counted from smaller particle size to the particle size (d25%) at 25% of 1.0 or more and 2.5 or less.

18 Claims, No Drawings

THERMOPLASTIC RESIN COMPOSITION

TECHNICAL FIELD

The present invention relates to a resin composition containing a polyamide and a polyphenylene ether and being reinforced with a platy inorganic filler. Further, the present invention relates to a thermoplastic resin composition noticeably improved in the balance between flowability (in particular flowability in a thin mold), dart impact strength and tensile elongation while maintaining excellent dimensional stability.

BACKGROUND ART

Polyphenylene ether has been used in a wide variety of applications because it is excellent in dimensional stability as well as mechanical and electrical properties and heat resistance. However, polyphenylene ether has a significant drawback that it is by itself poor in oil resistance and molding workability. In order to overcome this drawback, there has been proposed a technique to prepare a material in which a polyamide is blended with a polyphenylene ether, and such materials are nowadays used in an extremely wide variety of applications (Patent Document 1).

Recently, polyamide-polyphenylene ether resin compositions have been used in large-size molded products such as automotive fenders. When such molded products are used in combination with metal parts, high temperature environments cause troubles such as dimensional discrepancies and deformation caused by contact with metal parts because the molded products are too larger in linear expansion coefficient than the metal parts. Accordingly, there have been generally adopted such techniques in which an inorganic filler is blended with the resin composition in order to reduce the linear expansion coefficient of the resin composition. However, such blending has resulted in a problem that the impact resistance of the resin composition is remarkably degraded.

As techniques to reduce linear expansion coefficient and to improve Izod impact value, attempts have been made in which a small platy inorganic filler having an average particle size of 8 μm or less, in particular, 5 μm or less is blended with a polyamide-polyphenylene ether resin composition. Disclosed examples of such techniques include: a technique blending talc having an average particle size of 5 μm or less and an aspect ratio of 5 or more (Patent Document 2); a technique blending a platy inorganic filler having an average particle size of 5 μm or less and an aspect ratio of 3 or more (Patent Document 3); a technique blending a platy inorganic filler having an average particle size of 3 μm or less and a specific particle size distribution (Patent Document 4); a technique blending a platy filler having an average particle size of 1.2 to 5 μm and an L/D value of 3 or more and/or a fibrous inorganic filler having a fiber length of 2 μm or more, carbon black, fine fibrous carbon and a hydrogenated block copolymer having a number average molecular weight of 80,000 or less (Patent Document 5); a technique blending talc and carbon (Patent Document 6); a technique blending an inorganic filler having an average particle size of 8 μm or less and a hydrogenated block copolymer having a number average molecular weight of 50,000 to 180,000 (Patent Document 7); and a technique blending small-particle-size talc having an average particle size of 1 to 4 μm and large-particle-size talc having an average particle size of 5 to 10 μm (Patent Document 8).

However, because a platy inorganic filler having a small average particle size has a large surface area, the use of such a filler results in a remarkable degradation of flowability, in particular, a degradation of flowability in a thin mold. Additionally, the above-mentioned conventional techniques do not sufficiently improve tensile elongation.

Recently, application of polyamide-polyphenylene ether resin compositions filled with an inorganic filler and a conductive material to large-size thin-wall molded products such as automotive outer panels has come under review. In particular, the improvement of dart impact strength based on falling weight or the like and flowability in a thin mold, and the impartment of conductivity have come to be demanded.

As affairs now stand, in view of such demands from the market, the above-mentioned conventional techniques are poor in the balance between dart impact strength, tensile elongation and flowability, and have not yet reached a practical application level to be sufficiently satisfactory. Accordingly, resin compositions having excellent balance between dart impact strength, flowability and linear expansion coefficient, and additionally, having conductivity have long been awaited.

Patent Document 1: JP-B-45-997 (corresponding to U.S. Pat. No. 3,379,792)
Patent Document 2: JP-A-2-163158 (corresponding to U.S. Pat. No. 5,086,105)
Patent Document 3: JP-A-6-145499 (corresponding to U.S. Pat. No. 5,475,049)
Patent Document 4: JP-A-2002-194206
Patent Document 5: JP-A-2002-194207
Patent Document 6: JP-A-2003-528941 (corresponding to European Patent EP1,232,218)
Patent Document 7: JP-A-2004-285136
Patent Document 8: JP-A-5-220826

DISCLOSURE OF THE INVENTION

Problems to be Solved by the Invention

An object of the present invention is to provide a thermoplastic resin composition simultaneously satisfying a flowability and dart impact property, which are conflicting to each other, in a polyamide-polyphenylene ether alloy resin composition reinforced with an inorganic filler, and a molded product thereof, in particular, automotive exterior parts.

Means for Solving the Problems

The present inventors have made a diligent study in order to solve the above-mentioned problems. Consequently, the present inventors have reached the present invention by discovering that excellent dart impact strength and tensile elongation, and additionally excellent flowability are attained by using a platy inorganic filler having an average particle size of 9 to 20 μm, and having a particle size ratio (d75%/d25%) of the particle size (d25%) at 25% counted from smaller particle size to the particle size (d75%) at 75% of 1.0 or more and 2.5 or less.

More specifically the present invention includes the following aspects:

1. A thermoplastic resin composition comprising:
   (A) 30 to 80 parts by mass of a polyamide;
   (B) 20 to 70 parts by mass of a polyphenylene ether;
   (C) 0 to 40 parts by mass, based on 100 parts by mass of the total amount of the polyamide (A) and the polyphenylene ether (B), of a rubbery polymer; and
   (D) 10 to 50 parts by mass, based on 100 parts by mass of the total amount of the polyamide (A) and the polyphenylene ether (B), of a platy inorganic filler having an average particle size of 9 to 20 μm, and having a particle size ratio (d75%/d25%) of the particle size (d25%) at 25% counted from smaller particle size to the particle size (d75%) at 75% of 1.0 or more and 2.5 or less.
2. The thermoplastic resin composition according to the above item 1, wherein the average particle size of the platy inorganic filler (D) exceeds 10 μm and is 20 μm or less.
3. The thermoplastic resin composition according to the above item 1, wherein the average particle size of the platy inorganic filler (D) is 11 to 17 μm.
4. The thermoplastic resin composition according to the above item 1, wherein the platy inorganic filler (D) has a particle size ratio (d75%/d25%) of the particle size (d25%) at 25% counted from smaller particle size to the particle size (d75%) at 75%, of 1.5 or more and 2.5 or less.
5. The thermoplastic resin composition according to any one of the above items 1 to 4, wherein the platy inorganic filler (D) is talc.
6. The thermoplastic resin composition according to the above item 5, wherein the platy inorganic filler (D) is talc having a packed bulk density of 0.5 to 0.8 g/cm$^3$.
7. The thermoplastic resin composition according to the above item 5, wherein the platy inorganic filler (D) is talc and the crystallite size on the (002) diffraction plane of the talc as measured by wide angle X-ray diffraction is 600 Å or more.
8. The thermoplastic resin composition according to the above item 1, wherein the amount of the rubbery polymer (C) is 5 to 40 parts by mass based on 100 parts by mass of the total amount of the polyamide resin (A) and the polyphenylene ether resin (B).
9. The thermoplastic resin composition according to the above item 1, wherein the polyamide (A) includes at least one or more selected from the group consisting of polyamide 6, polyamide 6,6, polyamide 6/6,6, polyamide 6,12 and polyamide 6,6/6,I.
10. The thermoplastic resin composition according to any one of the above items 1 to 9, wherein the rubbery polymer (C) is an aromatic vinyl compound-conjugated diene compound block copolymer composed of a polymer block mainly composed of at least one aromatic vinyl compound and a polymer block mainly composed of at least one conjugated diene compound and/or a hydrogenated block copolymer derived from the aromatic vinyl compound-conjugated diene compound block copolymer.
11. The thermoplastic resin composition according to the above item 10, wherein the rubbery polymer (C) is a mixture of two or more block copolymers each including: (C1) a block copolymer containing 55% by mass or more and less than 90% by mass of a polymer block mainly composed of at least one aromatic vinyl compound, and (C2) a block copolymer containing 20% by mass or more and less than 55% by mass of a polymer block mainly composed of at least one aromatic compound, and wherein in the mixture: a number average molecular weight of one polymer block mainly composed of an aromatic vinyl compound is 10,000 or more and less than 30,000, and a number average molecular weight of one polymer block mainly composed of a conjugated diene compound is 50,000 or more and less than 100,000.
12. The thermoplastic resin composition according to the above item 11, wherein the rubbery polymer (C) is a mixture of two or more block copolymers each consisting of a block copolymer having a number average molecular weight larger than 80,000 and less than 120,000.
13. The thermoplastic resin composition according to any one of the above items 1 to 12, further including a conductive material as a component (E).
14. The thermoplastic resin composition according to the above item 13, wherein the conductive material (E) includes one or more selected from the group consisting of conductive carbon black and carbon fibril.
15. The thermoplastic resin composition according to the above item 14, wherein the conductive material (E) is added as a conductive master batch beforehand melt-kneaded with the polyamide (A).
16. The thermoplastic resin composition according to any one of the above items 1 to 15, having a dart impact strength of 6 J or more at 23° C., a melt flow rate (measured in conformity with ASTM D1238, with a load of 5 kg and at a temperature set at 280° C.) of 15 g/10 min or more, and a linear expansion coefficient (measured in conformity with JIS K7197, at a temperature increase rate of 5° C./min, with a load of 10 mN and within a temperature range from −30 to 80° C.) of $7.5 \times 10^{-5}$/° C. or less.
17. A molded article including the thermoplastic resin composition according to any one of the above items 1 to 16.
18. An automotive exterior part including the thermoplastic resin composition according to any one of the above items 1 to 16.

ADVANTAGE OF THE INVENTION

According to the present invention, a thermoplastic resin composition can be provided which is noticeably improved in the balance between flowability (in particular flowability in a thin mold), dart impact strength and tensile elongation while maintaining excellent dimensional stability.

BEST MODE FOR CARRYING OUT THE INVENTION

Detailed description will be made on each of the components constituting a thermoplastic resin composition of the present invention.

The usable type of the polyamide (A) in the present invention includes any polyamide provided that the repeating unit of the polymer main chain of the polyamide has an amide bond (—NH—C(=O)—). Polyamide is commonly obtained by polycondensation of a diamine and a dicarboxylic acid, ring-opening polymerization of lactams, and polycondensation of an aminocarboxylic acid and the like, but the preparation of polyamide is not limited to these methods.

The above-mentioned diamine is broadly classified into aliphatic diamines, alicyclic diamines and aromatic diamines. Specific examples of such diamines include tetramethylenediamine, hexamethylenediamine, undecamethylenediamine, dodecamethylenediamine, tridecamethylenediamine, 2,2,4-trimethylhexamethylenediamine, 2,4,4-trimethylhexamethylenediamine, 5-methylnonamethylenediamine, 1,3-bisaminomethylcyclohexane, 1,4-bisaminomethylcyclohexane, m-phenylenediamine, p-phenylenediamine, m-xylylenediamine, p-xylylenediamine, 1,9-nonanediamine and 2-methyl-1,8-octanediamine.

The dicarboxylic acid is broadly classified into aliphatic dicarboxylic acids, alicyclic dicarboxylic acids and aromatic dicarboxylic acids. Specific examples of such dicarboxylic acids include adipic acid, suberic acid, azelaic acid, sebacic acid, dodecanedioic acid, 1,1,3-tridecanedioic acid, 1,3-cyclohexanedicarboxylic acid, terephthalic acid, isophthalic acid, naphthalenedicarboxylic acid and dimer acid.

Specific examples of the lactams include ε-caprolactam, enantholactam and ω-laurolactam.

Specific examples of the aminocarboxylic acid include ε-aminocaproic acid, 7-aminoheptanoic acid, 8-aminooctanoic acid, 9-aminononanoic acid, 11-aminoundecanoic acid, 12-aminododecanoic acid and 13-aminotridecanoic acid.

In the present invention, any copolymerized polyamides may be used which are obtained by polycondensation of any one of these lactams, diamines, dicarboxylic acids and ω-aminocarboxylic acids or by polycondensation of a mixture of two or more thereof. Additionally, any copolymerized polyamides may preferably be used which are obtained by first polymerizing these lactams, diamines, dicarboxylic acids and ω-aminocarboxylic acids in a polymerization reactor to an extent where an oligomer having a low molecular weight is formed, and then processing it in an extruder or the like to have a high molecular weight.

Examples of the polyamide resin particularly usefully usable in the present invention include polyamide 6, polyamide 6,6, polyamide 4,6, polyamide 11, polyamide 12, polyamide 6,10, polyamide 6,12, polyamide 6/6,6, polyamide 6/6,12, polyamide-MXD (m-xylylenediamine)/6, polyamide 6,T, polyamide 6,I, polyamide 6/6,T, polyamide 6/6,I, polyamide 6,6/6,T, polyamide 6,6/6,I, polyamide 6/6,T/6,I, polyamide 6,6/6,T/6,I, polyamide 6/12/6,T, polyamide 6,6/12/6,T, polyamide 6/12/6,I and polyamide 6,6/12/6,I and polyamide 9,T. Polyamides obtained by copolymerizing two or more polyamides in an extruder or the like and blends of such copolymerized polyamides may also be used.

Preferable examples of the polyamide are polyamide 6, polyamide 6,6, polyamide 6/6,6, polyamide 6,12 and polyamide 6,6/6,I, and mixtures of these polyamides. More preferable examples of the polyamide are polyamide 6, 6, polyamide 6, a blend composed of polyamide 6,6 and polyamide 6, and a blend composed of polyamide 6,6 and polyamide 6,6/6,I. Further preferable examples of the polyamide are polyamide 6 and a blend composed of polyamide 6 and polyamide 6,6.

For the purpose of suppressing the degradation of impact property of the resin composition, a relative viscosity of the polyamide to be used in the present invention is preferably 2.0 or more. Further, for the purpose of improving the balance between flowability and surface impact property of the resin composition, a relative viscosity of the polyamide more preferably falls within a range from 2.2 to 2.8, and furthermore preferably within a range from 2.2 to 2.7. It is herein noted that the relative viscosity as referred to in the present invention means a value measured in conformity with JIS K6920-1:2000. Specifically, it is a value represented by $\eta r = t_1/t_0$ wherein $t_1$ is a flow time measured at 25° C. with an Ostwald viscometer for a solution of a polyamide dissolved in 98% concentrated sulfuric acid in a concentration of 1 g/100 cm³, and $t_0$ is a flow time measured at 25° C. for 98% concentrated sulfuric acid itself.

In the present invention, when polyamides are used as a mixture, the relative viscosity can be determined by means of a method in which the relative viscosity is measured by separating the polyamide components contained in the composition, or a method in which the relative viscosity is measured for a mixed solution prepared by mixing, according to the blend ratio of the polyamide components used as the raw materials, the solutions each containing one of the polyamide components used in a concentration (1 g/100 cm³) for the $\eta r$ measurement.

The terminal groups of a polyamide generally include amino groups and carboxyl groups, and the ratio of amino group/carboxyl group (concentration ratio) (hereinafter also referred to as the terminal group ratio) is preferably 1/9 to 9/1, more preferably 1/9 to 5/5, and furthermore preferably 2/8 to 4/6 and most preferably 2/8 to 3/7.

As the method for regulating the terminal group ratios of these polyamide resins, known methods to be understood by those skilled in the art can be used. Examples of such methods may include a method in which diamines, dicarboxylic acids, monocarboxylic acids and the like are added so as to give a predetermined terminal group ratio at the time of polymerization of the polyamide resin, and a method in which the terminal group ratio is regulated by using a mixture composed of two or more polyamide resins different in the terminal group ratio.

Additionally, for the purpose of improving thermal stability of a polyamide resin, a known metallic stabilizer as disclosed in JP-A-1-163262 can be used without any problem. Particularly preferably usable examples of such metallic stabilizers are CuI, $CuCl_2$, copper acetate and cerium stearate. Alkali metal halides typified by potassium iodide and potassium bromide can also be suitably used. Needless to say, they can be used in combination without any problem. The preferable mixing amount of the metallic stabilizer and/or the alkali metal halide is, as a total amount, 0.001 to 1 part by mass in relation to 100 parts by mass of the polyamide resin.

Further, in addition to the above-mentioned substances, known additives and the like which can be added to the polyamide can be added without any problem in an amount less than 10 parts by mass in relation to 100 parts by mass of the polyamide.

The polyphenylene ether (B) usable in the present invention includes a homopolymer and/or a copolymer each composed of a structural unit represented by formula (1):

[Formula 1]

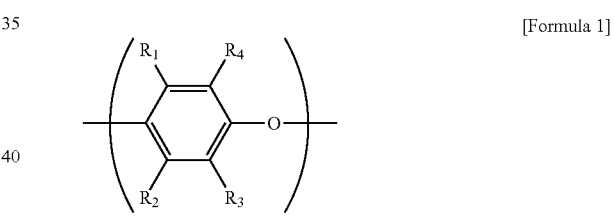

wherein O represents an oxygen atom, $R_1$ to $R_4$ each are independently a hydrogen atom, a halogen atom, a lower primary or secondary alkyl group, a phenyl group, a haloalkyl group, an aminoalkyl group, a hydrocarbonoxy group or a halohydrocarbonoxy group (with the proviso that at least two carbon atoms interpose between the halogen atom and the oxygen atom).

Specific examples of the polyphenylene ether of the present invention may include poly(2,6-dimethyl-1,4-phenylene ether), poly(2-methyl-6-ethyl-1,4-phenylene ether), poly(2-methyl-6-phenyl-1,4-phenylene ether) and poly(2,6-dichloro-1,4-phenylene ether). Further, additional examples may include polyphenylene ether copolymers such as copolymers of 2,6-dimethylphenol with other phenols (for example, a copolymer with 2,3,6-trimethylphenol and a copolymer with 2-methyl-6-butylphenol as described in JP-B-52-17880).

Particularly preferable among these polyphenylene ethers are poly(2,6-dimethyl-1,4-phenylene ether), a copolymer of 2,6-dimethylphenol with 2,3,6-trimethylphenol, and a mixture of these.

No particular constraint is imposed on the preparation method of the polyphenylene ether to be used in the present invention; known preparation methods of polyphenylene ether can be used. Examples of such usable methods may include the preparation methods described in U.S. Pat. Nos. 3,306,874, 3,306,875, 3,257,357 and 3,257,358, and JP-A-50-51197 and JP-A-63-152628.

The reduced viscosity ($\eta$ sp/c: 0.5 g/dl, chloroform solution, measured at 30° C.) of the polyphenylene ether usable in the present invention preferably falls within a range from 0.15 to 0.70 dl/g, more preferably from 0.20 to 0.60 dl/g and further preferably from 0.40 to 0.55 dl/g.

In the present invention, a mixture prepared by blending two or more polyphenylene ethers different in reduced viscosity can be used without any problem. Examples of such a mixture may include a mixture composed of a polyphenylene ether having a reduced viscosity of 0.45 dl/g or less and a polyphenylene ether having a reduced viscosity of 0.50 dl/g or more, and a mixture composed of a low molecular weight polyphenylene ether having a reduced viscosity of 0.40 dl/g or less and a polyphenylene ether having a reduced viscosity of 0.50 dl/g or more. However, needless to say, such a mixture is not limited to these examples.

Additionally, the polyphenylene ether usable in the present invention may be a wholly or partially modified polyphenylene ether. The modified polyphenylene ether as referred to herein means a polyphenylene ether modified with at least one modifying compound having in the molecular structure thereof at least one carbon-carbon double or triple bond and at least one carboxylic acid group, acid anhydride group, amino group, hydroxy group or glycidyl group.

Examples of the preparation method of such a modified polyphenylene ether may include: (1) a method in which a polyphenylene ether is reacted with a modifying compound in the presence or absence of a radical initiator, without melting the polyphenylene ether, at temperatures falling within a range of 100° C. or higher and lower than the glass transition temperature of the polyphenylene ether; (2) a method in which a polyphenylene ether is reacted with a modifying compound by melt-kneading in the presence or absence of a radical initiator at temperatures falling within a range of the glass transition temperature of the polyphenylene ether or higher and 360° C. or lower; and (3) a method in which a polyphenylene ether is reacted with a modifying compound in a solution in the presence or absence of a radical initiator at temperatures lower than the glass transition temperature of the polyphenylene ether. Any of these methods can be used without any problem, but preferable among these are the methods (1) and (2).

Next, specific description is made on the at least one modifying compound having in the molecular structure thereof at least one carbon-carbon double or triple bond and at least one carboxylic acid group, acid anhydride group, amino group, hydroxyl group or glycidyl group.

Examples of a modifying compound simultaneously having within the molecule thereof a carbon-carbon double bond and a carboxylic acid group or an acid anhydride group may include maleic acid, fumaric acid, chloromaleic acid, cis-4-cyclohexene-1,2-dicarboxylic acid and anhydrides of these acids. Particularly satisfactory are fumaric acid, maleic acid and maleic anhydride, and particularly preferable are fumaric acid and maleic anhydride. Additionally, those compounds obtained from these unsaturated dicarboxylic acids by esterification of one or two of the carboxyl groups thereof are also usable.

Examples of a modifying compound simultaneously having within the molecule thereof a carbon-carbon double bond and a glycidyl group may include allyl glycidyl ether, glycidyl acrylate, glycidyl methacrylate, and epoxidized natural oils and fats. Particularly preferable among these are glycidyl acrylate and glycidyl methacrylate.

Examples of a modifying compound simultaneously having within the molecule thereof a carbon-carbon double bond and a hydroxy group may include: unsaturated alcohols represented by a general formula $C_nH_{2n-3}OH$ (n is a positive integer) such as allyl alcohol, 4-penten-1-ol, 1,4-pentadien-3-ol; and unsaturated alcohols represented by general formulas $C_nH_{2n-5}OH$ and $C_nH_{2n-7}OH$ (n is a positive integer).

The above-mentioned modifying compounds may be used each alone or in combinations of two or more thereof.

When a modified polyphenylene ether is prepared, the addition amount of the modifying compound(s) is preferably 0.1 to 10 parts by mass and more preferably 0.3 to 5 parts by mass in relation to 100 parts by mass of the polyphenylene ether. When a modified polyphenylene ether is prepared by using a radical initiator, the addition amount of the radical initiator is preferably 0.001 to 1 part by mass in relation to 100 parts by mass of the polyphenylene ether.

Additionally, the addition proportion of the modifying compound in the modified polyphenylene ether is preferably 0.01 to 5% by mass and more preferably 0.1 to 3% by mass. It causes no problem if the unreacted modifying compound and/or the polymer of the modifying compound remains in the above-mentioned modified polyphenylene ether.

A styrene thermoplastic resin may be blended as long as the amount thereof is less than 50 parts by mass in relation to 100 parts by mass of the total amount of the polyphenylene ether. Examples of the styrene thermoplastic resin as referred to in the present invention may include homopolystyrene, rubber-modified polystyrene (HIPS), styrene-acrylonitrile copolymer (AS resin), styrene-rubbery polymer-acrylonitrile copolymer (ABS resin).

Further, known additives and the like that can be added to polyphenylene ether may be added to polyphenylene ether in an amount less than 10 parts by mass in relation to 100 parts by mass of polyphenylene ether.

Preferable among the rubbery polymers (C) contained in the thermoplastic resin composition of the present invention is one or more selected from the group consisting of an aromatic vinyl compound-conjugated diene compound block copolymer composed of a polymer block mainly composed of at least one aromatic vinyl compound and a polymer block mainly composed of at least one conjugated diene compound, a hydrogenated product of the block copolymer and an ethylene-$\alpha$-olefin copolymer.

The phrase "mainly composed of" in the polymer block mainly composed of an aromatic vinyl compound means a block in which at least 50% by mass or more of the block is composed of an aromatic vinyl compound. The proportion of the aromatic vinyl compound is more preferably 70% by mass or more, further preferably 80% by mass or more and most preferably 90% by mass or more. The phrase "mainly composed of" in the polymer block mainly composed of a conjugated diene compound means similarly a block in which at least 50% by mass or more of the block is composed of a conjugated diene compound. The proportion of the conjugated diene compound is more preferably 70% by mass or more, furthermore preferably 80% by mass or more and most preferably 90% by mass or more.

In this connection, even in a case where, for example, a small amount of the conjugated diene compound or other compounds are randomly bonded to the aromatic vinyl compound block, when the 50% by mass or more of the block is composed of the aromatic vinyl compound, the block is regarded as a block copolymer mainly composed of an aromatic vinyl compound. This is also the case for the conjugated diene compound.

Specific examples of the aromatic vinyl compound usable in the aromatic vinyl compound-conjugated diene compound block copolymer of the present invention may include styrene, α-methylstyrene and vinyl toluene. One or more compounds selected from these compounds are used, and particularly preferable among these is styrene.

Specific examples of the conjugated diene compound may include butadiene, isoprene, piperylene and 1,3-pentadiene. One or more compounds selected from these are used; preferable among these are butadiene, isoprene and a combination thereof.

The microstructure of the soft segment portion of the conjugated diene compound in the above-mentioned block copolymer is preferably such that the 1,2-vinyl content thereof or the total content of the 1,2-vinyl content and the 3,4-vinyl content is preferably 5 to 80%, more preferably 10 to 50% and most preferably 10 to 40%.

The block copolymer of the present invention is preferably a block copolymer in which the polymer block [S] mainly composed of an aromatic vinyl compound and the polymer block [B] mainly composed of a conjugated diene compound have the bonding type selected from the S-B type, the S-B-S type and the S-B-S-B type. Alternatively, the block copolymer may be a mixed block copolymer having these bonding types. More preferable among these are the S-B-S type and the S-B-S-B type; the types may be combined to give a mixed block copolymer.

The block copolymer, usable in the thermoplastic resin composition of the present invention, of an aromatic vinyl compound and a conjugated diene compound is more preferably a hydrogenated block copolymer. A hydrogenated block copolymer as referred to herein means a block copolymer obtained by hydrogenating the above-mentioned block copolymer of an aromatic vinyl compound and a conjugated diene compound in such a way that the proportion of the aliphatic double bonds in the polymer block mainly composed of the conjugated diene compound is controlled so as to fall within a range from larger than 0% to 100%. The hydrogenation proportion of the above-mentioned hydrogenated block copolymer is preferably 50% or more, more preferably 80% or more and most preferably 98% or more. Such block copolymers can be used without any problem as a mixture of a non-hydrogenated block copolymer and a hydrogenated block copolymer.

In the present invention, the block copolymer of the component (C) is preferably a mixture of two or more of block copolymers comprising: (C1) a block copolymer containing 55% by mass or more and less than 90% by mass of a polymer block mainly composed of at least one aromatic vinyl compound, and (C2) a block copolymer containing 20% by mass or more and less than 55% by mass of a polymer block mainly composed of at least one aromatic vinyl compound.

In the above-mentioned mixture, it is preferred that the number average molecular weight of one polymer block mainly composed of an aromatic vinyl compound falls within a range of 10,000 or more and less than 30,000, and the number average molecular weight of one polymer block mainly composed of a conjugated diene compound falls within a range of 50,000 or more and less than 100,000. More preferably, in the mixture of the block copolymers, the number average molecular weight of one polymer block mainly composed of an aromatic vinyl compound is 10,000 or more and less than 25,000, and the number average molecular weight of one polymer block mainly composed of a conjugated diene compound is 50,000 or more and less than 80,000.

For the purpose of noticeably improving flowability and surface impact property, in a mixture of two or more block copolymers each composed of the components (C1) and (C2), preferably the number average molecular weight of one polymer block mainly composed of an aromatic vinyl compound and the number average molecular weight of one polymer block mainly composed of a conjugated diene compound are adjusted so as to fall within the above-mentioned ranges, respectively.

The number average molecular weight of one polymer block mainly composed of an aromatic vinyl compound and the number average molecular weight of one polymer block mainly composed of a conjugated diene compound, in the block copolymer as referred to in the present invention, can be calculated from the number average molecular weights of the individual block copolymers of the component (C), the mass percentages of all the polymer blocks mainly composed of an aromatic vinyl compound in each of the block copolymers and the mass percentages of all the polymer blocks mainly composed of a conjugated diene compound in each of the block copolymers.

Specifically, the number average molecular weights of the individual block copolymers of the component (C) mean the number average molecular weights relative to polystyrene standards measured with a gel permeation chromatography (GPC SYSTEM 21 manufactured by Showa Denko Co., Ltd.) as detected with an ultraviolet spectroscopic detector (UV-41, manufactured by Showa Denko Co., Ltd.). (The measurement conditions are as follows: solvent: chloroform, temperature: 40° C., sample columns (K-G, K-800RL, K-800R), reference columns (two columns of K-805L), flow rate: 10 ml/min, measurement wavelength: 254 nm, pressure: 15 to 17 kg/cm². ) In this connection, low molecular weight components due to the catalyst deactivation in polymerization are detected as the case may be; when detected, such components are excluded from the molecular weight calculation.

The number average molecular weight of each of the block copolymers contained in the composition can be identified as follows. Pellets, for example, are sliced with a microtome to a thickness of 20 to 50 μm, soaked in chloroform and extracted for approximately one hour with a thermostatic shaker set at approximately 80° C. to dissolve polyphenylene ether and block copolymers in chloroform. This mixture is filtered off, and the filtrate is added dropwise with methanol in an amount more than three times the amount of the filtrate for reprecipitation. The reprecipitate was vacuum dried to yield a powdery sample. Then, the powdery sample is dissolved in methylene chloride and the solution thus obtained is allowed to stand in an environment at −10° C. for 12 hours. The precipitated component (polyphenylene ether component) is filtered off and the filtrate is subjected to measurement with a gel permeation chromatography measurement apparatus to enable to identify the number average molecular weight.

The number average molecular weight of one polymer block mainly composed of an aromatic vinyl compound in one type of block copolymer can be determined with the following formula by using the above-mentioned number average molecular weight of the block copolymer:

$$Mn_{(a),n} = \{Mn \times a/(a+b)\}/N_{(a)} \qquad (2)$$

wherein $Mn_{(a),n}$ represents the number average molecular weight of one polymer block mainly composed of an aromatic vinyl compound in a block copolymer n, Mn represents the number average molecular weight of the block copolymer n, a represents the mass percentage of the polymer block mainly composed of an aromatic vinyl compound in the block copolymer n, b represents the mass percentage of the polymer block mainly composed of a conjugated diene compound in the block copolymer n, and $N_{(a)}$ represents the number of the polymer blocks each mainly composed of an aromatic vinyl compound in the block copolymer n.

Further, because typically the block copolymer of the component (C) is a mixture of two or more of the block copolymers each composed of the components (C1) and (C2), the number average molecular weight of one polymer block mainly composed of an aromatic vinyl compound in the mixture can be determined from the following formula:

$$Mn_{(a),av} = \Sigma(Mn_{(a),n} \times Cn) \quad (3)$$

wherein $Mn_{(a),av}$ represents the number average molecular weight of one polymer block mainly composed of an aromatic vinyl compound in the mixture of the block copolymers, $Mn_{(a),n}$ represents the number average molecular weight of one polymer block mainly composed of an aromatic vinyl compound of the block copolymer n, and Cn represents the weight fraction of the block copolymer n in the mixture of the block copolymers.

On the other hand, the number average molecular weight of one polymer block mainly composed of a conjugated diene compound in one type of block copolymer can be determined with the following formula by using the above-mentioned number average molecular weight of the block copolymer:

$$Mn_{(b),n} = \{Mn \times b/(a+b)\}/N_{(b)} \quad (4)$$

wherein $Mn_{(b),n}$ represents the number average molecular weight of one polymer block mainly composed of a conjugated diene compound in an block copolymer n, Mn represents the number average molecular weight of the block copolymer n, a represents the mass percentage of the polymer block mainly composed of an aromatic vinyl compound in the block copolymer n, b represents the mass percentage of the polymer block mainly composed of a conjugated diene compound in the block copolymer n, and $N_{(b)}$ represents the number of the polymer blocks each mainly composed of a conjugated diene compound in the block copolymer n.

Further, because typically the block copolymer of the component (C) is a mixture of two or more of the block copolymers each composed of the components (C1) and (C2), the number average molecular weight of one polymer block mainly composed of a conjugated diene compound in the mixture can be determined from the following formula:

$$Mn_{(b),av} = \Sigma(Mn_{(b),n} \times Cn) \quad (5)$$

wherein $Mn_{(b),av}$ represents the number average molecular weight of one polymer block mainly composed of a conjugated diene compound in the mixture of the block copolymers, $Mn_{(b),n}$ represents the number average molecular weight of one polymer block mainly composed of a conjugated diene compound of the block copolymer n, and Cn represents the weight fraction of the block copolymer n in the mixture of the block copolymers.

Additionally, in the present invention, more preferably, by preparing the component (C) as a mixture of two or more block copolymers each composed exclusively of a block copolymer having a number average molecular weight of less than 120,000, the balance between flowability and surface impact property can be further improved. Particularly preferably, the component (C) is prepared as a mixture composed exclusively of block copolymers each having a number average molecular weight of larger than 80,000 and smaller than 120,000.

Provided that the effect of the present invention is not impaired, these aromatic vinyl compound-conjugated diene compound block copolymers may be used as mixtures composed of such block copolymers that are different from each other in the bonding type, in the type of the aromatic vinyl compound, in the type of the conjugated diene compound, in the 1,2-bond vinyl content or in the 1,2-bond vinyl content and 3,4-bond vinyl content, in the aromatic vinyl compound content, in the hydrogenation proportion, and in others.

Additionally, the block copolymers used in the thermoplastic resin composition of the present invention may be beforehand mixed with an oil mainly composed of paraffin. By beforehand mixing an oil mainly composed of paraffin, the workability of the resin composition can be improved. In this connection, the amount of the oil mainly composed of paraffin is preferably 1 to 70 parts by mass in relation to 100 parts by mass of the block copolymer. Mixing of the oil in an amount of 70 parts by mass or more degrades the handleability.

The oil mainly composed of paraffin as referred to herein means a mixture composed of hydrocarbon compounds each having a weight average molecular weight falling within a range from 500 to 10000, the mixture being a combination of an aromatic ring-containing compound, a naphthene ring-containing compound and a paraffin compound, wherein the paraffin compound content is 50% by mass or more. The oil mainly composed of paraffin more preferably has a paraffin compound content of 50 to 90% by mass, a naphthene ring-containing compound content of 10 to 40% by mass and an aromatic ring-containing compound content of 5% by mass or less. Such oils mainly composed of paraffin are commercially available; examples of such oils include PW380 manufactured by Idemitsu Kosan Co., Ltd.

As an ethylene-α-olefin copolymer used in the thermoplastic resin composition according to the present invention, preferably usable is such an ethylene-α-olefin copolymer, as described in JP-A-2001-302911, prepared with a single-site catalyst.

Additionally, a rubbery polymer used in the thermoplastic resin composition of the present invention may be a wholly or partially modified rubbery polymer. A modified rubbery polymer as referred to herein means a rubbery polymer modified with at least one modifying compound having in the molecular structure thereof at least one carbon-carbon double or triple bond and at least one carboxylic acid group, acid anhydride group, amino group, hydroxyl group or glycidyl group.

Examples of the preparation method of the above-mentioned modified rubbery polymer include: (1) a method in which a rubbery polymer is reacted with a modifying compound in the presence or absence of a radical initiator by melt-kneading at temperatures falling within a range from the softening temperature of the rubbery polymer or higher to 250° C. or lower; (2) a method in which a rubbery polymer is reacted with a modifying compound in a solution in the presence or absence of a radical initiator at temperatures of the softening temperature of the rubbery polymer or lower; and (3) a method in which a rubbery polymer is reacted with a modifying compound without melting them in the presence or absence of a radical initiator at temperatures of the softening temperature of the rubbery polymer or lower. Any of these methods can be used without any problem, but preferable among these is the method (1); further, most preferable is the method (1) that is carried out in the presence of a radical initiator.

As at least one modifying compound, as referred to herein, having in the molecular structure thereof at least one carbon-carbon double or triple bond and at least one carboxylic acid group, acid anhydride group, amino group, hydroxyl group or glycidyl group, there can be used the same modifying compound as described for the modified polyphenylene ether.

The platy inorganic filler (D) of the present invention has an average particle size of 9 to 20 μm and has a particle size ratio (d75%1d25%) of the particle size (d75%) at 75% counted from smaller particle size to the particle size (d25%) at 25% of 1.0 or more and 2.5 or less. The average particle size of the platy inorganic filler is preferably larger than 10 μm and 20 μm or less, more preferably 11 to 17 μm, further preferably 12 to 17 μm and particularly preferably 13 to 17 μm. In other words, the use of relatively large platy inorganic fillers having an average particle size of 9 to 20 μm, instead of small platy inorganic fillers having an average particle size of 5 μm or less, makes it possible to noticeably improve flowability.

Additionally, in the measurement of the particle size of the platy inorganic filler, a particle size ratio (d75%/d25%) of the particle size (d75%) at 75% counted from smaller particle size to the particle size (d25%) at 25% is more preferably 1.2 or more and 2.5 or less, further preferably 1.5 or more and 2.5 or less, and particularly preferably 1.5 or more and 2.0 or less. In other words, the use of the platy inorganic filler having a d75%/d25% value of 1.0 or more and 2.5 or less makes it possible to noticeably improve dart impact strength and tensile elongation of the resin composition. Additionally, further preferably the proportion of the particles having particle sizes of 10 μm or less is 50% or less and the proportion of the particles having particle sizes of 20 μm or more is 25% or less; and particularly preferably the proportion of the particles having particle sizes of 10 μm or less is 40% or less and the proportion of the particles having particle sizes of 20 μm or more is 20% or less.

The average particle size and the particle size distribution as referred to herein are based on volume-based particle sizes measured with a laser diffraction/scattering particle size distribution analyzer. The particle size is a value measured with ethanol as a dispersion medium for the platy inorganic filler. Specifically, the particle size can be obtained by carrying out a blank measurement for ethanol as a dispersion medium using a laser diffraction/scattering particle size distribution analyzer LA-910 (manufactured by Horiba Ltd.), and then making a measurement for a sample prepared so as to contain the measurement sample to give a predetermined transmittance (95% to 70%). The sample is dispersed in the dispersion medium by irradiating supersonic wave for one minute.

As the platy inorganic filler of the present invention, the following materials can be used as pulverized and/or sieved materials provided that they are in conformity with the above-mentioned shapes: micas such as kaolinite, talc, sericite, white mica and bronze mica; layered clay minerals such as chlorite, montmorillonite and hallosites; and artificial platy fillers such as glass flake and metal platy particles. Particularly preferable among these is talc obtained by subjecting a natural mineral containing as the main component thereof magnesium silicate to purification, pulverization and classification. Artificially synthesized fillers can also be used. One or more of these fillers can be blended.

The platy inorganic filler to be used in the present invention preferably has a packed bulk density falling within a range from 0.5 to 0.8 g/cm$^3$. The packed bulk density is more preferably falls within a range from 0.5 to 0.75 g/cm$^3$. Platy inorganic fillers having a packed bulk density of 0.5 to 0.8 g/cm$^3$ are also excellent in feed stability during preparation and enable to obtain compositions small in physical property variation.

Generally, platy inorganic fillers frequently have a packed bulk density falling within a range from 0.5 to 1.3 g/cm$^3$. Among these fillers, particularly preferably used in the present invention is talc having a packed bulk density of 0.5 to 0.8 g/cm$^3$ to make it possible to simultaneously satisfy linear expansion coefficient, flowability, surface impact property and tensile elongation.

The term packed bulk density as referred to in the present invention means a kind of apparent density of a powder obtained with a powder tester (for example, a tester manufactured by Hosokawa Micron Ltd.). Specifically, the packed bulk density is a value measured from a weight of talc contained in a volume of 100 cm$^3$ after applying a predetermined vibration to a 100 cm$^3$ vessel wherein the unit is g/cm$^3$. Usually, the number of the applied vibrations (vertical motion) is 180 and the amplitude falls within a range of 5 cm or less. The packed bulk density of a specimen is an index of compressibility of the specimen. The index shows that the higher is this value, the more easily the specimen is compressed to be packed.

Additionally, the aerated bulk density of talc usable in the present invention is not particularly limited, but is preferably 0.4 g/cm$^3$ or less. The aerated bulk density is a density value derived from a weight of talc contained in a volume of 100 cm$^3$ before applying the vibrations for measurement of the above-mentioned packed bulk density.

Preferably, the platy inorganic filler of the present invention is talc, and the crystallite size on the (002) diffraction plane of the talc as measured by wide angle X-ray diffraction is 600 Å or more. The crystallite size on the (002) diffraction plane is more preferably 620 Å or more, and furthermore preferably 650 Å or more.

The (002) diffraction plane of talc as referred to herein can be confirmed in such a way that talc $Mg_3Si_4O_{10}(OH)_2$ is identified with a wide angle X-ray diffractometer (specifically, a RAD-RX wide angle X-ray diffractometer manufactured by Rigaku Corp.), and that the observed inter-layer separation thereof corresponds with approximately 9.39 Å, which is the lattice plane separation associated with the (002) diffraction plane of talc. The crystallite size on the (002) diffraction plane of talc is derived from the half width of the peak.

Additionally, the platy inorganic filler of the present invention may contain a surface treating agent such as a silane coupling agent to be added for the purpose of improving the affinity to the resin. The amount of such a surface treating agent is not limited, but approximately falls within a range of 5 parts by mass or less in relation to 100 parts by mass of the platy inorganic filler.

The thermoplastic resin composition of the present invention preferably contains a conductive material (E). The conductive material used in the present invention includes at least one or more selected from the group consisting of conductive carbon black and carbon fibril.

Examples of the conductive carbon black usable in the present invention may include carbon black described as a conductive carbon black in WO01/081473. Examples of commercially available conductive carbon blacks include Ketjen Black EC and Ketjen Black EC600JD available from Ketjen Black International Company. Examples of the carbon fibril usable in the present invention include a fine carbon fiber described in International Publication No. WO94/023433. Examples of the commercially available carbon fibril include BN fibril available from Hyperion Catalyst International Inc.

A preferable form of addition of the conductive material used in the present invention is the addition in a form of a master batch prepared by beforehand mixing the conductive material in one or more resins selected from polyphenylene ether, polyamide and a block copolymer. Preferable is a method in which the conductive material is added in a form of a master batch prepared by beforehand mixing the conductive material in polyamide. The mixing method in this case is not particularly limited, but most preferable is the melt kneading with an extruder. Examples of more preferable methods may include a method in which, by using a co-rotating twin screw extruder, equipped with two or more feed openings, set at 250 to 350° C., a resin is fed from an upstream feed opening to be melt-kneaded, and then carbon is fed from a downstream feed opening to be melt-kneaded. In this case, the temperature of the resin is preferably set at lower than 340° C. The mixing content of the conductive material in the above-mentioned master batch is preferably 5 to 30% by mass and more preferably 8 to 15% by mass.

As the above-mentioned master batch, a commercially available master batch may be used. Examples of such commercially available master batches include polyamide 66/carbon fibril master batch (trade name: Polyamide 66 with Fibril™ Nanotubes RMB4620-00: carbon fibril content 20%) available from Hyperion Catalyst International Inc.

The mixing proportions of the individual components in the thermoplastic resin composition of the present invention are as follows: the amount of polyamide resin (A) is 30 to 80 parts by mass and the amount of polyphenylene ether resin (B) is 20 to 70 parts by mass; and in relation to 100 parts by mass of the total amount of the polyamide resin (A) and the polyphenylene ether resin (B), the amount of a rubbery polymer (C) is 0 to 40 parts by mass, and the amount of a platy inorganic filler (D) having an average particle size of 9 to 20 µm and having a particle size ratio (d75%/d25%) of the particle size (d25%) at 25% counted from smaller particle size to the particle size (d75%) at 75% of 1.0 or more and 2.5 or less is 10 to 50 parts by mass. More preferably, the mixing proportions are as follows: the amount of the component (A) is 30 to 80 parts by mass and the amount of the component (B) is 20 to 70 parts by mass; and in relation to 100 parts by mass of the total amount of the components (A) and (B), the amount of the component (C) is 5 to 40 parts by mass, and the amount of the component (D) is 10 to 30 parts by mass. Further preferably, the mixing proportions are as follows: the amount of the component (A) is 50 to 80 parts by mass and the amount of the component (B) is 20 to 50 parts by mass; and in relation to 100 parts by mass of the total amount of the components (A) and (B), the amount of the component (C) is 5 to 30 parts by mass, and the amount of the component (D) is 10 to 30 parts by mass.

Additionally, when the conductive material (E) is added to the thermoplastic resin composition of the present invention, the content of the conductive material (E) is preferably 0.5 to 3.0% by mass and more preferably 1.0 to 2.0% by mass in relation to the total content of the thermoplastic resin composition of 100% by mass.

Additionally, a compatibilizing agent may be added to the thermoplastic resin composition of the present invention. The main purpose of the use of a compatibilizing agent is to improve the physical properties of the polyamide-polyphenylene ether mixture. The compatibilizing agent usable in the present invention means a multifunctional compound interacting with polyphenylene ether, polyamide or both of these. When any of such compounds is used, the obtained polyamide-polyphenylene ether mixture desirably exhibits improved compatibility.

Examples of the compatibilizing agent usable in the thermoplastic resin composition of the present invention are described in JP-A-8-48869 and JP-A-9-124926 in detail. These known compatibilizing agents are all usable, and also usable in combination.

Particularly preferable examples among these various compatibilizing agents include maleic acid, maleic anhydride and citric acid. Maleic anhydride is most preferable among them.

The amount of the compatibilizing agent usable in the present invention is preferably 0.1 to 20 parts by mass and more preferably 0.1 to 10 parts by mass in relation to 100 parts by mass of the total amount of polyamide and polyphenylene ether.

In the present invention, in addition to the above components, other additional components may be added, according to need within a range not impairing advantageous effects of the present invention. Examples of such additional components are as follows.

That is, the examples include other thermoplastic resins such as polyester and polyolefin; flame retardants such as halogenated resins, silicone flame retardants, magnesium hydroxide, aluminum hydroxide, organic phosphoric acid ester compounds, ammonium polyphosphate and red phosphorus; fluorine-containing polymers having antidripping effect; plasticizers such as oil, low molecular weight polyolefin, polyethylene glycol, fatty acid esters and metal montanates; flame retardant aids such as antimony trioxide; colorants; antistatic agents; various peroxides; zinc oxide; zinc sulfide; antioxidants; phosphite antioxidants; ultraviolet absorbers; and photostabilizers.

Specific amounts of these components are such that the total of the amounts is not more than 100 parts by mass in relation to 100 parts by mass of the total amount of polyamide and polyphenylene ether.

No particular constraint is imposed on the preparation methods of the thermoplastic resin composition of the present invention; some examples of such methods are listed below.

1. A method in which by using a twin screw extruder equipped with at least one feed opening at an upstream position, a polyphenylene ether, a rubbery polymer, a polyamide and a platy inorganic filler, and additionally a conductive material (inclusive of a master batch) are fed to the extruder to be melt-kneaded.

2. A method in which by using a twin screw extruder equipped with at least two feed openings, namely, a feed opening (first feed opening) at an upstream position and a feed opening (second feed opening) at a midstream position, a polyphenylene ether and a rubbery polymer are fed through the first feed opening to be melt-kneaded, and thereafter a polyamide and a platy inorganic filler, and additionally a conductive material (inclusive of a master batch) are fed through the second feed opening to be melt-kneaded.

3. A method in which by using a twin screw extruder equipped with at least three feed openings, namely, a feed opening (first feed opening) at an upstream position, a feed opening (second feed opening) at a midstream position and a feed opening (third feed opening) at a downstream position, a polyphenylene ether and a rubbery polymer are fed through the first feed opening to be melt-kneaded, thereafter a polyamide and additionally a conductive material (inclusive of a master batch) are fed through the second feed opening to be melt-kneaded, and then a platy inorganic filler and additionally a conductive material (inclusive of a master batch) are fed through the third feed opening to be melt-kneaded.

The above method 3 is most preferable among them.

Additionally, a platy inorganic filler may be added in a form of a master batch. For example, a method may be mentioned in which the addition is made in a form of a master batch prepared by beforehand mixing a platy inorganic filler in polyamide.

No particular constraint is imposed on the melt-kneading temperature; the conditions for preparing a preferable composition may be selected usually within a temperature range from 240 to 360° C.

The thermoplastic resin composition of the present invention preferably has a dart impact strength of 6 J or more at 23° C., a melt flow rate (measured in conformity with ASTM D1238, with a load of 5 kg and at a temperature set at 280° C.) of 15 g/10 min or more, and a linear expansion coefficient (measured in conformity with JIS $K_{7197}$, at a temperature increase rate of 5° C./min, with a load of 10 mN and within a temperature range from −30 to 80° C.) of $7.5 \times 10^{-5}$/° C. or less.

The thermoplastic resin composition thus obtained according to the present invention can be molded as molded articles for various components by using various heretofore known methods, for example, by injection molding.

Examples of the various components used suitably include: IC tray materials; electric and electronic parts such as chassis and cabinets for various disc players and the like; OA parts and machinery parts for various computers, their peripheral devices and the like; additionally, exterior parts such as motorbike cowls, automotive fenders, door panels, front panels, rear panels, locker panels, rear bumper panels, back door garnishes, emblem garnishes, fuel inlet panels, over fenders, outer door handles, door mirror housings, bonnet air intakes, bumpers, bumper guards, roof rails, roof rail legs, pillars, pillar covers, wheel covers, various aero parts typified by spoilers and the like, various moldings and emblems; and interior parts typified by instrument panels, console boxes, trims and the like.

Among them, the composition can be suitably used for automotive exterior parts.

EXAMPLES

Hereinafter, the present invention will be described in detail with reference to Examples and Comparative Examples; however, the present invention is not limited to what are described in these examples.

(Raw Materials Used)

Raw materials used in Examples and the like are as follows.

(A) Polyamide (Hereinafter Abbreviated as PA)

(PA-1) Polyamide 6

Relative viscosity (98% sulfuric acid/25° C.)=2.3 (JIS K6810)

Amino group/carboxyl group ratio (concentration ratio)= 0.4

(PA-2) Polyamide 6,6

Relative viscosity (98% sulfuric acid/25° C.)=2.6 (JIS K6810)

Amino group/carboxyl group ratio (concentration ratio)= 0.3

(B) Polyphenylene Ether (Hereinafter Abbreviated as PPE as the Case may be)

(PPE-1) Polyphenylene ether poly(2,6-dimethyl-1,4-phenylene ether) (manufactured by Asahi Kasei Chemicals Corp.)

Reduced viscosity: 0.42 dl/g (0.5 g/dl, chloroform solution, measured at 30° C.)

(PPE-2) Maleic anhydride-modified polyphenylene ether

Prepared by adding to 100 parts by mass of (PPE-1), 0.1 part by mass of a radical initiator and 1.5 parts by mass of maleic anhydride, and by melt-kneading the reaction mixture thus obtained with a twin screw extruder at a cylinder temperature of 320° C. The addition proportion of maleic anhydride was 0.5%.

(C) Rubbery Polymer (Hereinafter Abbreviated as SEBS)

(SEBS-1) Polystyrene-hydrogenated polybutadiene-polystyrene

Number average molecular weight=246,000

Number average molecular weight per one polystyrene block=41,300

Number average molecular weight of hydrogenated polybutadiene=167,500

Total content of styrene component=33% by mass 1,2-Vinyl content=33%

Hydrogenation proportion of the polybutadiene portion=98% or more (SEPS-2) Polystyrene-hydrogenated polyisoprene-polystyrene Number average molecular weight=100,000

Number average molecular weight per one polystyrene block=15,000

Number average molecular weight of hydrogenated polyisoprene=70,000

Total content of styrene component=30% by mass

Hydrogenation proportion of the polyisoprene portion=98% or more (SEBS-3) Polystyrene-hydrogenated polybutadiene-polystyrene Number average molecular weight=97,000

Number average molecular weight per one polystyrene block=29,100

Number average molecular weight of hydrogenated polybutadiene=38,800

Total content of styrene component=60% by mass 1,2-Vinyl content=36%

Hydrogenation proportion of the polybutadiene portion=98% or more (D) Platy Inorganic Filler (Talc-1)

Average particle size: 8.89 μm, median size: 8.38 μm d75%/d25%=1.64, crystallite size on the (002) diffraction plane=580 Å

Proportion of the particles having a particle size of 10 μm or less=68%, proportion of the particles having a particle size of 20 μm or more=1%

Packed bulk density: 0.92 g/cm$^3$ (Talc-2)

Average particle size: 11.85 μm, median size: 10.68 μm d75%/d25%=1.91, crystallite size on the (002) diffraction plane=620 Å

Proportion of the particles having a particle size of 10 μm or less=45%, proportion of the particles having a particle size of 20 μm or more=9%

Packed bulk density: 0.78 g/cm$^3$ (Talc-3)

Average particle size: 13.62 μm, median size: 12.31 μm d75%/d25%=1.88, crystallite size on the (002) diffraction plane=670 Å

Proportion of the particles having a particle size of 10 μm or less=33%, proportion of the particles having a particle size of 20 μm or more=15%

Packed bulk density: 0.70 g/cm$^3$ (Talc-4)

Average particle size: 17.67 μm, median size: 12.41 μm d75%/d25%=2.64, crystallite size on the (002) diffraction plane=670 Å

Proportion of the particles having a particle size of 10 μm or less=38%, proportion of the particles having a particle size of 20 μm or more=27%

Packed bulk density: 0.86 g/cm³

(E) Conductive Material

A conductive master batch (PA/KB-MB) was obtained by melt-kneading with a twin screw extruder 90 parts by mass of polyamide 6,6 (PA-2) and 10 parts by mass of a conductive carbon black (Ketjen Black EC-600-JD, manufactured by Ketjen Black International Company).

(The preparation method of the resin composition pellets in Examples 1 to 5 and Comparative Examples 1 to 4)

A twin screw extruder [ZSK-58MC, manufactured by Coperion Co. (Germany)], having a feed opening (first feed opening) at an upstream position, a feed opening (second feed opening) at a midstream position and a feed opening (third feed opening) at a downstream position, was used and the conditions were set that the cylinder temperature was 300° C., the screw rotation number was 300 rpm and the discharge rate was 400 kg/hr. The pellet of each of the resin compositions was prepared, according to the composition shown in Table 1 or 2, in such a way that polyphenylene ether and a rubbery polymer were fed through the first feed opening, polyamide and additionally the conductive master batch were fed through the second feed opening, and further any one of various talcs was fed through the third opening to be melt-kneaded.

Each of the pellets thus obtained was subjected to the measurement of the individual physical properties according to the following manners. The results thus obtained are shown in Tables 1 and 2. It is to be noted that the feed amount of the talc was stable in the preparation of the resin composition of each of Examples, but the feed amount of the talc was varied in the preparation of the resin composition of each of Comparative Examples.

(Measurement Methods of the Individual Physical Properties)

Hereinafter, the measurement methods of the individual physical properties will be described.

<Flowability (MFR)>

Each of the thus obtained resin composition pellets was dried at 80° C. for 3 hours, and the flow amount thereof per 10 minutes was measured in conformity of ASTM D1238 under the conditions that the temperature was set at 280° C. and the load was 5 kg.

<Flowability in a Thin Mold>

Each of the thus obtained resin composition pellets was subjected to a measurement of the spiral flow distance (SFD) for a thickness of 2 mm with a molding machine FE120 manufactured by Nissei Plastic Industrial Co., Ltd. The molding conditions were set that the cylinder temperature was 300° C., the die temperature was 110° C. and the injection pressure was 118 MPa.

<Dart Impact Strength (Dart)>

Each of the thus obtained resin composition pellets was dried at 80° C. for 3 hours, from which a platy specimen of 50×90×2.5 mm was prepared with a Toshiba IS-80EPN molding machine (set at a cylinder temperature of 290° C. and at a die temperature of 80° C.) under the conditions that the injection time was 20 seconds and the cooling time was 20 seconds. An impact test was carried out from the height of 128 cm with a Graphic Impact Tester (manufactured by Toyo Seiki Seisaku-Sho, Ltd.) under the conditions that the holder diameter φ was 40 mm, the striker diameter was 12.7 mm and the striker weight was 6.5 kg, and thus the total absorbed energy was measured.

<Tensile Test>

Each of the thus obtained resin composition pellets was dried at 80° C. for 3 hours, from which a TYPE I specimen described in ASTM D638 was prepared with a Toshiba IS-80EPN molding machine (set at a cylinder temperature of 280° C. and at a die temperature of 80° C.). The tensile elongation was measured by the tensile test in conformity with ASTM D638.

<Linear Expansion Coefficient>

Each of the thus obtained resin composition pellets was dried at 80° C. for 3 hours, from which a plate specimen of 50×90×2.5 mm was prepared with a Toshiba IS-80EPN molding machine (set at a cylinder temperature of 290° C. and at a die temperature of 80° C.) under the conditions that the injection time was 20 seconds and the cooling time was 20 seconds, and the test was carried out.

From the central portion of the plate specimen, a specimen of 10×4×2.5 mm was cut out, the linear expansion coefficient of which was measured in conformity with JIS K7197 with TMA-7 (manufactured by Perkin-Elmer Corp.) at a temperature increase rate of 5° C./min with a load of 10 mN within a temperature range from −30 to 80° C.

<Conductivity>

Each of the thus obtained resin composition pellets was dried at 80° C. for 3 hours, from which a specimen was molded as a dumbbell bar as described in ISO294 with a Toshiba IS-80EPN molding machine (set at a cylinder temperature of 280° C. and at a die temperature of 80° C.). The both ends of the thus obtained specimen were broken off to obtain a uniform specimen having a sectional area of 10×4 mm and a length of 70 mm with a fracture surface at each end.

The manner for breaking off the both ends of the specimen was such that the specimen was beforehand scratched with a utility knife, then soaked for one hour in dry ice/methanol at −75 to −70° C., and then the both ends were broken off. The fracture surface at each end was coated with a silver coating material, and the volume resistivity between the fracture surfaces was measured at an applied voltage of 250 V with an electrometer (R8340A, manufactured by Advantest Corp.). Measurement was carried out by using 5 different specimens and the arithmetic mean value thus obtained was taken as the conductivity (volume resistivity value).

TABLE 1

|  |  |  | Example 1 | Example 2 | Example 3 | Comparative Example 1 | Comparative Example 2 |
|---|---|---|---|---|---|---|---|
| Composition (parts by mass) | First feed opening | PPE-1 | 14 | 14 | 14 | 14 | 14 |
|  |  | PPE-2 | 14 | 14 | 14 | 14 | 14 |
|  |  | SEBS-1 | — | — | 9 | 9 | 9 |

TABLE 1-continued

|  |  |  | Example 1 | Example 2 | Example 3 | Comparative Example 1 | Comparative Example 2 |
|---|---|---|---|---|---|---|---|
|  |  | SEPS-2 | 7 | 7 | — | — | — |
|  |  | SEBS-3 | 2 | 2 | — | — | — |
|  | Second feed opening | PA-1 | 43 | 43 | 43 | 43 | 43 |
|  | Third feed opening | Talc-1 | — | — | — | 20 | — |
|  |  | Talc-2 | 20 | — | — | — | — |
|  |  | Talc-3 | — | 20 | 20 | — | — |
|  |  | Talc-4 | — | — | — | — | 20 |
| Properties of platy inorganic filler | Average particle size (μm) |  | 11.85 | 13.62 | 13.62 | 8.89 | 17.67 |
|  | Median size (μm) |  | 10.68 | 12.31 | 12.31 | 8.38 | 12.41 |
|  | d25% (μm) |  | 7.67 | 8.92 | 8.92 | 6.54 | 7.98 |
|  | d75% (μm) |  | 14.64 | 16.81 | 16.81 | 10.74 | 21.04 |
|  | d75%/d25% |  | 1.91 | 1.88 | 1.88 | 1.64 | 2.64 |
|  | Crystallite size on (002) diffraction plane (Å) |  | 620 | 670 | 670 | 580 | 670 |
| Evaluation of physical properties | MFR (g/10 min) |  | 21 | 25 | 23 | 14 | 23 |
|  | Thin-wall SFD (cm) |  | 52 | 56 | 53 | 48 | 52 |
|  | Dart (J) |  | 9 | 14 | 11 | 14 | 3 |
|  | Tensile elongation (%) |  | 16 | 20 | 18 | 8 | 10 |
|  | Linear expansion coefficient ($\times 10^{-5}/°C$) | Direction parallel to flow | 5.8 | 5.8 | 5.8 | 5.9 | 5.8 |
|  |  | Direction perpendicular to flow | 5.8 | 5.8 | 5.8 | 5.9 | 5.8 |

TABLE 2

|  |  |  | Example 4 | Example 5 | Comparative Example 3 | Comparative Example 4 |
|---|---|---|---|---|---|---|
| Composition (parts by mass) | First feed opening | PPE-1 | 15 | 15 | 15 | 15 |
|  |  | PPE-2 | 15 | 15 | 15 | 15 |
|  |  | SEBS-1 | — | — | 9 | 9 |
|  |  | SEPS-2 | 7 | 7 | — | — |
|  |  | SEBS-3 | 2 | 2 | — | — |
|  | Second feed opening | PA-1 | 29 | 29 | 29 | 29 |
|  |  | PA/KB-MB | 17 | 17 | 17 | 17 |
|  | Third feed opening | Talc-1 | — | — | 15 | — |
|  |  | Talc-2 | 15 | — | — | — |
|  |  | Talc-3 | — | 15 | — | — |
|  |  | Talc-4 | — | — | — | 15 |
| Properties of platy inorganic filler | Average particle size (μm) |  | 11.85 | 13.62 | 8.89 | 17.67 |
|  | Median size (μm) |  | 10.68 | 12.31 | 8.38 | 12.41 |
|  | d25% (μm) |  | 7.67 | 8.92 | 6.54 | 7.98 |
|  | d75% (μm) |  | 14.64 | 16.81 | 10.74 | 21.04 |
|  | d75%/d25% |  | 1.91 | 1.88 | 1.64 | 2.64 |
|  | Crystallite size on (002) diffraction plane (Å) |  | 620 | 670 | 580 | 670 |
| Evaluation of physical properties | MFR (g/10 min) |  | 18 | 21 | 13 | 19 |
|  | Thin-wall SFD (cm) |  | 56 | 60 | 52 | 57 |
|  | Dart (J) |  | 8 | 10 | 12 | 3 |
|  | Tensile elongation (%) |  | 16 | 16 | 11 | 12 |
|  | Linear expansion coefficient ($\times 10^{-5}/°C$) | Direction parallel to flow | 7.0 | 7.0 | 7.1 | 7.0 |
|  |  | Direction perpendicular to flow | 7.0 | 7.0 | 7.1 | 7.0 |
|  | Conductivity (Ω · cm) |  | $9.2 \times 10^4$ | $9.2 \times 10^4$ | $1.6 \times 10^5$ | $1.6 \times 10^5$ |

It was found that there can be obtained a composition improved in the balance between dart impact strength, tensile elongation and flowability, while maintaining excellent dimensional stability, by using talc having an average particle size of 9 μm or more and 20 μm or less, and having a particle size ratio (d75%/d25%) of the particle size (d25%) at 25% counted from smaller particle size to the particle size (d75%) at 75% of 1.0 or more and 2.5 or less.

The invention claimed is:

1. A thermoplastic resin composition comprising:
   (A) 30 to 80 parts by mass of a polyamide;
   (B) 20 to 70 parts by mass of a polyphenylene ether;
   (C) 0 to 40 parts by mass, based on 100 parts by mass of the total amount of the polyamide (A) and the polyphenylene ether (B), of a rubbery polymer; and
   (D) 10 to 50 parts by mass, based on 100 parts by mass of the total amount of the polyamide (A) and the polyphenylene ether (B), of a platy inorganic filler having an average particle size of 9 to 20 μm, and having a particle size ratio (d75%/d25%) of the particle size (d75%) at 75% counted from smaller particle size to the particle size (d25%) at 25% of 1.0 or more and 2.5 or less.

2. The thermoplastic resin composition according to claim 1, wherein the average particle size of the platy inorganic filler (D) exceeds 10 μm and is 20 μm or less.

3. The thermoplastic resin composition according to claim 1, wherein the average particle size of the platy inorganic filler (D) is 11 to 17 μm.

4. The thermoplastic resin composition according to claim 1, wherein the platy inorganic filler (D) has a particle size ratio (d75%/d25%) of the particle size (d75%) at 75% counted from smaller particle size to the particle size (d25%) at 25%, of 1.5 or more and 2.5 or less.

5. The thermoplastic resin composition according to claim 1, wherein the platy inorganic filler (D) is talc.

6. The thermoplastic resin composition according to claim 5, wherein the platy inorganic filler (D) is talc having a packed bulk density of 0.5 to 0.8 g/cm$^3$.

7. The thermoplastic resin composition according to claim 5, wherein the platy inorganic filler (D) is talc and the crystallite size on the (002) diffraction plane of the talc as measured by wide angle X-ray diffraction is 60 Å or more.

8. The thermoplastic resin composition according to claim 1, wherein the amount of the rubbery polymer (C) is 5 to 40 parts by mass based on 100 parts by mass of the total amount of the polyamide resin (A) and the polyphenylene ether resin (B).

9. The thermoplastic resin composition according to claim 1, wherein the polyamide (A) comprises at least one or more selected from the group consisting of polyamide 6, polyamide 6,6, polyamide 6/6,6, polyamide 6,12 and polyamide 6,6/6,I.

10. The thermoplastic resin composition according to claim 1, wherein the rubbery polymer (C) is an aromatic vinyl compound-conjugated diene compound block copolymer comprising a polymer block mainly comprising at least one aromatic vinyl compound and polymer block mainly comprising at least one conjugated diene compound and/or a hydrogenated block copolymer derived from the aromatic vinyl compound-conjugated diene compound block copolymer.

11. The thermoplastic resin composition according to claim 10, wherein the rubbery polymer (C) is a mixture of two or more block copolymers each comprising:

(C1) a block copolymer containing 55% by mass or more and less than 90% by mass of a polymer block mainly comprising at least one aromatic vinyl compound; and (C2) a block copolymer containing 20% by mass or more and less than 55% by mass of a polymer block mainly comprising at least one aromatic compound; and wherein in the mixture:

a number average molecular weight of one polymer block mainly comprising an aromatic vinyl compound is 10,000 or more and less than 30,000; and a number average molecular weight of one polymer block mainly comprising a conjugated diene compound is 50,000 or more and less than 100,000.

12. The thermoplastic resin composition according to claim 11, wherein the rubbery polymer (C) is a mixture of two or more block copolymers each consisting of a block copolymer having a number average molecular weight larger than 80,000 and less than 120,000.

13. The thermoplastic resin composition according to claim 1, further comprising a conductive material as a component (E).

14. The thermoplastic resin composition according to claim 13, wherein the conductive material (E) comprises one or more selected from the group consisting of conductive carbon black and carbon fibril.

15. The thermoplastic resin composition according to claim 14, wherein the conductive material (E) is added as a conductive master batch beforehand melt-kneaded with the polyamide (A).

16. The thermoplastic resin composition according to claim 1, having a dart impact strength of 6 J or more at 23° C., a melt flow rate (measured in conformity with ASTM D1238, with a load of 5 kg and at a temperature set at 280° C.) of 15 g/10 min or more, and a linear expansion coefficient (measured in conformity with JIS K7197, at a temperature increase rate of 5° C./min, with a load of 10 mN and within a temperature range from −30 to 80° C.) of $7.5 \times 10^{-5}$/° C. or less.

17. A molded article comprising the thermoplastic resin composition according to claim 1.

18. An automotive exterior part comprising the thermoplastic resin composition according to claim 1.

* * * * *

UNITED STATES PATENT AND TRADEMARK OFFICE
CERTIFICATE OF CORRECTION

| | | |
|---|---|---|
| PATENT NO. | : 7,786,206 B2 | Page 1 of 1 |
| APPLICATION NO. | : 11/795374 | |
| DATED | : August 31, 2010 | |
| INVENTOR(S) | : Makoto Doki et al. | |

It is certified that error appears in the above-identified patent and that said Letters Patent is hereby corrected as shown below:

On the Title Page, Item (30), in the "Foreign Application Priority Data" line 1, "2005-010532" should read --2005-010432--.

Signed and Sealed this
Tenth Day of May, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,786,206 B2 | |
| APPLICATION NO. | : 11/795374 | |
| DATED | : August 31, 2010 | |
| INVENTOR(S) | : Makoto Doki et al. | |

It is certified that error appears in the above-identified patent and that said Letters Patent is hereby corrected as shown below:

On the Title Page, Item (86), in the "PCT No.:", "PCT/JP2006/000504" should read --PCT/JP2006/300504--.

Signed and Sealed this
Fifth Day of July, 2011

David J. Kappos
*Director of the United States Patent and Trademark Office*